E. M. Smith.
Mower.
Nº 41,746.  Patented Feb. 23, 1864.
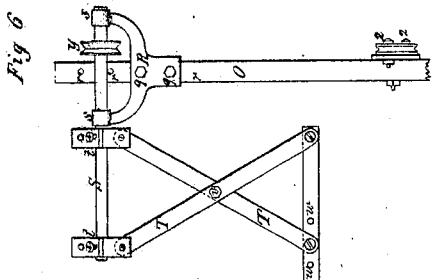
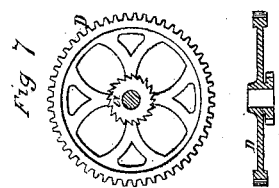
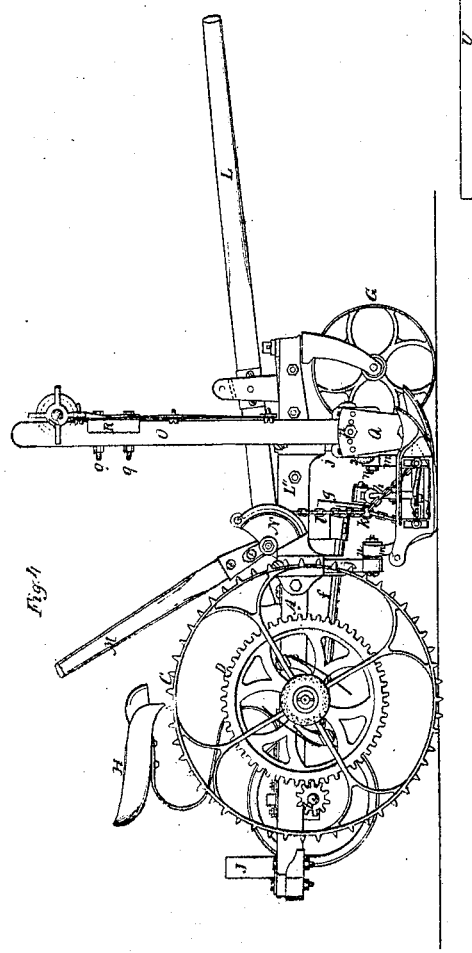
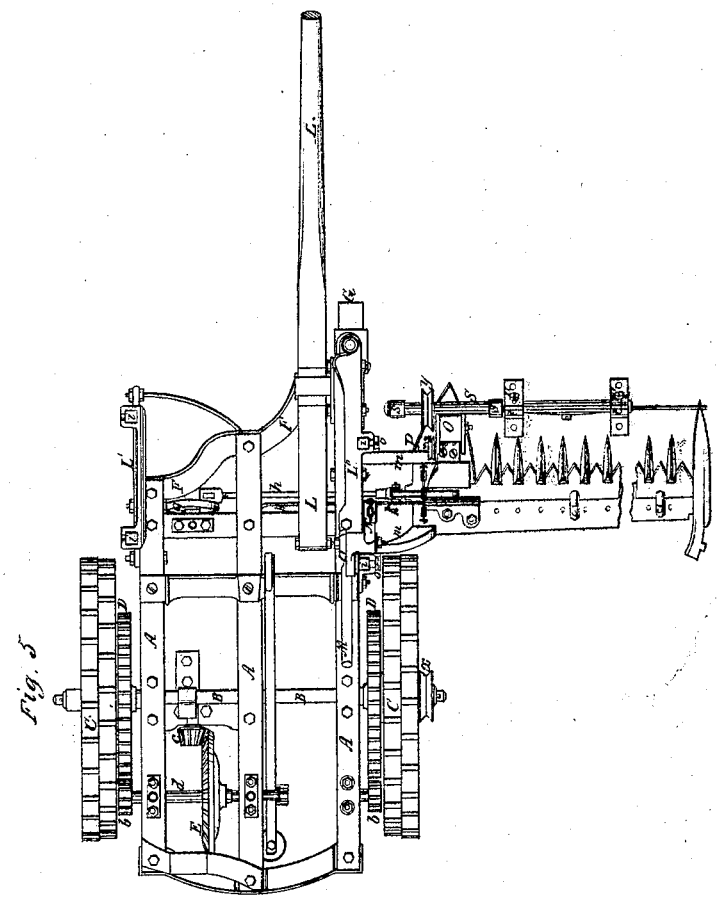
Witnesses:
P. E. Wilson
C. Evans Jr.
Inventor
Edgar M. Smith
by Atty A. B. Stoughton

United States Patent Office.

EDGAR M. SMITH, OF NEW YORK, N. Y., ASSIGNOR TO MITCHELL, VANCE & CO., OF SAME PLACE.

IMPROVEMENT IN HARVESTERS.

Specification forming part of Letters Patent No. 41,746, dated February 23, 1864.

*To all whom it may concern:*

Be it known that I, EDGAR M. SMITH, of the city, county, and State of New York, have invented certain new and useful Improvements in a Combined Reaping and Mowing Machine; and I do hereby declare that the following is a full, clear, and exact description of the same, reference being had to the accompanying drawings, making a part of this specification, in which—

Figure 1 represents a side view of the machine as arranged for cutting grain, and Fig. 2 represents a top plan of the same. Fig. 3 represents a reversible double-acting ratchet and pawl. Fig. 4 represents a side view of the same machine as arranged for cutting grass, and Fig. 5 represents a top plan of the same. Fig. 6 represents a portion of the reel, showing how it may be adjusted to give its blades greater or less sweep. Fig. 7 represents one of the main cog-wheels and its ratchet united, it being shown both in elevation and in section.

Similar letters of reference, where they occur in the several separate figures, denote like parts of the machine in all the figures.

In cutting grain it is necessary to place the cutting apparatus at or near the rear of the main frame, so as to facilitate the delivery of the cut grain upon the ground out of the way of the path of the machine on its return swath; but in cutting grass the cutters should be placed at or near the front of the main frame, for several reasons: first, because, as the cutters must work close to the ground and there are always to be found obstructions of some kind or other over which the cutters must be raised or eased, it is important that the driver or conductor, who faces toward the horses, should be able to see these intervening obstacles, so as to raise and lower the cutting apparatus accordingly—a thing he cannot do when the cutters are behind him, but which is not so important in cutting grain, as the cutters are then raised at considerable distance above the ground, and only very large and easily-seen obstacles could in that position touch them, this forward position of the cutters being desirable; secondly, because in case the driver or conductor should be thrown from his seat, which often happens, he would fall behind instead of in front of the cutters; and, thirdly, it is important as it eases the draft of the machine, and all cutters would be arranged at the front of the main frame were it not that in cutting grain this position so interferes with the delivery of the cut grain on the ground clear of the path of the machine on its next round. My invention is based upon these conditions in cutting grain and cutting grass, and I have so constructed and arranged the several parts of my machine as to readily adapt it to both conditions by simply shifting some of its parts, as will be explained in connection with the drawings.

A represents a main frame, to which the axle B is permanently affixed. The main supporting and driving wheels C C run loose upon the the journals of the axle B, and upon the hubs of the wheels C C are loosely placed the cogged gears D D, each gear having cast or permanently wrought upon it a ratchet, *a*, with which spring-pawls *c*, attached to the spokes of the wheels C, work when requisite, so that the gears D may work fast and loose on the wheels C as occasion may require, and as will be further explained. The cog-gears D D work into pinions *b b*, one on each end of a shaft, *d*, which shaft turns in its bearings with the pinions, and on this shaft *d* is a bevel-gear, E, which meshes with and turns a bevel-pinion, *e*, on the end of an inclined shaft, *f*, the opposite end of which shaft carries a crank-wheel, *g*, to which the pitman *h* is attached for driving the cutters. One side, A', of the main frame is longer than the other side, A'', and their ends are connected and braced by a curved brace, F, which arrangement gives a support for a caster-wheel, G, a raker's seat, H, but more especially a gaveling-space, I, into which the grain may be drawn and deposited without interfering with the free action of the rake, as would be the case if the side A'' were as long or projected as far as the opposite side, A'.

Upon the bar or brace F, which I prefer to make of cast-iron of a flanged or angle shape for the sake of lightness with strength, is placed a guiding and supporting piece, J, which, when the machine is arranged for reaping grain, serves as a support for the raker's seat H, (the driver's seat being at K,) but which, when the machine is changed and reversed, as will be presently described, to arrange it for cutting grass, becomes a tongue support and guide, said tongue, when the machine is arranged for reaping, being in the position shown at L, Figs. 1 and 2.

On the side pieces, A' A", are secured the plates or pieces L' L", each furnished with square or round boxes $i$ $i$ to receive the square or round pieces $j$ $j$, which aid to form the hinged and yielding connection of the finger-bar and cutting apparatus, together with the reel and platform, when used, to the main frame, the object of the two plates L' L" and their boxes being for the purpose of shifting the cutting apparatus from one side of the machine to the other, which, when done, together with the shifting of the main supporting and driving wheels C and the tongue L, as seen in Figs. 2 and 5, converts the machine from a reaper to a mower, and the cutting apparatus, which for a reaper was placed in rear of the main frame, is now for a mower at or near the forward end of the main frame, and thus the two prerequisites of a reaper and mower maintained in one and the same machine.

The lifting-lever M, Figs. 4 and 5, which has a segment, N, upon its lower end, is connected to a bar, $k$, by a chain, $l$, or other flexible connection, and the bar $k$ is in turn connected to the inside shoe or inner end of the finger-bar, so that by means of the lever the cutting apparatus may be raised and lowered at pleasure. The bar $k$ is so hung to the under side of the main frame as that it may move longitudinally in its support, for the purpose of sliding it endwise farther under the frame when it becomes necessary or desirable to raise up the finger-bar and cutting apparatus high enough to swing them against and rest them upon or against the main frame.

From the inside shoe, or from the inner end of the finger-bar, there rise two curved arms, $m$ $m$, which connect with the sliding pieces $j$ $j$ by hinged joints at $n$ $n$, so that the finger-bar and its connected parts may work on said hinges in yielding to any inequalities in the ground, or so that they may rise up vertically to the extent of several inches by the shanks or pieces $j$ $j$ sliding through their boxes or guides $i$ $i$, while they are prevented from descending below a certain adjusted position by means of the pins or set-screws $o$ $o$.

The reel-post O is set on or in the inner shoe, P, and secured by a segment-plate, Q, by which it may be leaned more toward or from the standing grain to throw the reel more into or from the grain, as may be desirable, and when so adjusted it is held in adjustment by a set-screw, $p$, or otherwise. On top of the reel-post O there is a saddle, R, which can be raised or lowered on said post, when necessary, by the set-screws $q$ $q$ and adjusting-holes $r$ $r$; and in the bearings $s$ $s$ of this saddle R is supported a short reel-shaft, S, on which are sliding heads or hubs $t$ $t$, that are permanently held in place, when adjusted, by set-screws $u$, and to these heads or hubs the arms T T are united that carry the reel-blades U. The arms T T cross each other, and are pivoted at their point of crossing, $v$, and by the sliding of the heads or hubs $t$ on the shaft S and the adjusting-holes $w$ in the blades U the diameter of the reel may be changed so as to make it reach farther into the standing grain and work closer to the cutters, or less, as the condition of the crop may require. The reel may be driven by an endless belt running over and around the pulley $x$ on the hub of one of the main drive-wheels, and a pulley, $y$, on the end of the reel-shaft, said belt also passing around intermediate pulleys, 2 2, at or near the heel of the reel-post O, so that said post may be set forward or back without slacking the belt.

Figs. 1 and 2 represent the machine as arranged for cutting grain or as a reaper, and Figs. 4 and 5 represent the same parts when arranged for cutting grass or as a mower, the only real change of parts being the pitman, for as the crank-wheel and its shaft are not in the center of the main frame a longer pitman would be required in one case than in the other. If, however, the crank-wheel and crank-shaft should be arranged equidistant from each side of the main frame, then the same pitman would answer; but I prefer to arrange as I have shown and to use an extra pitman.

To change the machine from a reaper, as shown in Figs. 1, 2, to a mower, as shown in Figs. 4, 5, the wheels are taken off and shifted "side for side," as it is termed, or transposed, and if the ordinary shouldered ratchets be used, then the gears D should be also arranged to make the pawls act fast and loose, according to the changed direction in which the machine is to move; but if the ratchet and pawls be like those shown in Fig. 3, then it is only necessary to turn over the pawls, as shown by the red and black lines in said figure, and the same result would be attained—viz., reversing the fast and loose condition of the gears upon or with the driving and supporting wheels. The wheels and ratchets being thus changed, the cutting apparatus is detached from the right rear side of the frame and carried round to the opposite side and arranged in the plate L", the tongue L is carried to the other end of the machine and secured in suitable bearings, and the machine, as shown in Figs. 4 and 5, is now arranged for mowing. The lifting-lever M may also be shifted around, though in cutting grain, the cutters being set up several inches above the ground, the raising and lowering of the cutting apparatus is not so necessary as in mowing, in which latter case the cutters work very close to the ground.

Of the cutting apparatus and outside shoe or divider I do not deem it necessary to enter into a full description. They are distinctly shown and represented.

The caster-wheel without any change of position adapts itself to the changed condition of the machine from a reaper to a mower; but, as will be perceived, from being in the rear to support the raker in the first it is in front to take the weight of the machine off from the horses' necks in the second condition of the machine.

Having thus fully described the object, nature, and purpose of my invention, what I claim therein as new, and desire to secure by Letters Patent, is—

1. In combination with the main driving and supporting wheels running loosely on their axles or journals, the main gear-wheels D, running loosely on the hubs of said drive-wheels and having a ratchet-and-pawl connection with each other, substantially in the manner and for the purpose herein described and represented.

2. The arrangement of the two sets of plates and boxes on the opposite sides of the main frame so that the cutting apparatus may be arranged on either side, as set forth.

3. In combination with the two sets of plates arranged on opposite sides of the main frame, the curved bar or brace F, extending from one to the other, so as to leave unobstructed space at I for the free action of the rake, as described.

4. In combination with the loose and shifting main wheels and main cogged gears, the pinions $b$, permanently arranged on the shaft $d$, so that said loose and shifting wheels will, when on either side of machine, mesh with said pinions, as set forth, whichever end of the machine goes foremost.

5. Hanging the reel-blades to the reel-shaft by means of the crossed arms and adjustable heads, hubs, or sockets, for the purpose of enlarging or diminishing the circumference of the reel, substantially as described.

EDGAR M. SMITH.

Witnesses:
WM. H. KIPP,
HENRY C. BUSH.